United States Patent
Huang et al.

(10) Patent No.: US 8,209,736 B2
(45) Date of Patent: Jun. 26, 2012

(54) SYSTEMS AND METHODS FOR MANAGING TELEVISION (TV) SIGNALS

(75) Inventors: Po Chun Huang, Chubei (TW); Shao-Lun Li, Kao-Hsiung (TW)

(73) Assignee: Mediatek Inc., Hsin-Chu (TW)

( * ) Notice: Subject to any disclaimer, the term of this patent is extended or adjusted under 35 U.S.C. 154(b) by 686 days.

(21) Appl. No.: 11/772,313

(22) Filed: Jul. 2, 2007

(65) Prior Publication Data

US 2008/0052753 A1  Feb. 28, 2008

Related U.S. Application Data

(60) Provisional application No. 60/823,260, filed on Aug. 23, 2006.

(51) Int. Cl.
*H04N 7/16* (2011.01)
(52) U.S. Cl. .......... 725/141; 725/152; 725/62; 455/3.06
(58) Field of Classification Search .................. None
See application file for complete search history.

(56) References Cited

U.S. PATENT DOCUMENTS

| | | | |
|---|---|---|---|
| 7,580,005 B1 * | 8/2009 | Palin | 345/1.1 |
| 2002/0061771 A1 | 5/2002 | Hwang | |
| 2005/0043020 A1 | 2/2005 | Lipsanen et al. | |
| 2005/0086706 A1 | 4/2005 | Kasamatsu et al. | |
| 2005/0235221 A1 * | 10/2005 | Asoh et al. | 715/789 |
| 2005/0239401 A1 | 10/2005 | Nam | |
| 2006/0133429 A1 * | 6/2006 | Seo et al. | 370/535 |
| 2006/0282870 A1 * | 12/2006 | Chen | 725/118 |
| 2007/0130610 A1 * | 6/2007 | Aarnio et al. | 725/134 |
| 2007/0214484 A1 * | 9/2007 | Taylor et al. | 725/100 |

FOREIGN PATENT DOCUMENTS

| | | |
|---|---|---|
| CN | 1362791 A | 8/2002 |
| EP | 1180903 | 2/2002 |
| JP | 2006-20284 | 1/2006 |
| TW | 200509692 | 3/2005 |
| TW | 200605658 | 2/2006 |
| WO | 2005/120051 | 12/2005 |

OTHER PUBLICATIONS

Dell Inspiron 4150 Owners Manual Rev. A02, Dell Computer Corporation, Nov. 2002, p. 1-10.*
CN Office Action mailed Aug. 29, 2008.
English abstract of CN1362791, pub. Aug. 7, 2002.
English language translation of abstract of TW 200509692 (published Mar. 1, 2005).
English language translation of abstract of TW 200605658 (published Feb. 1, 2006).
English language translation of abstract of WO2005120051 (published Dec. 15, 2005).
English language translation of JP 2006-20284 (published Jan. 19, 2006).

* cited by examiner

*Primary Examiner* — Dominic D Saltarelli
*Assistant Examiner* — Jason J Chung
(74) *Attorney, Agent, or Firm* — Thomas|Kayden

(57) ABSTRACT

Methods for managing digital television (TV) signals are disclosed. An embodiment of a method for managing digital TV signals, performed by an electronic device, comprises the following steps. Multiple first digital TV signals and multiple second digital TV signals are selectively received, thereby enabling a display device thereof or an external display to present a series of frames corresponding to the selected digital TV signals.

17 Claims, 17 Drawing Sheets

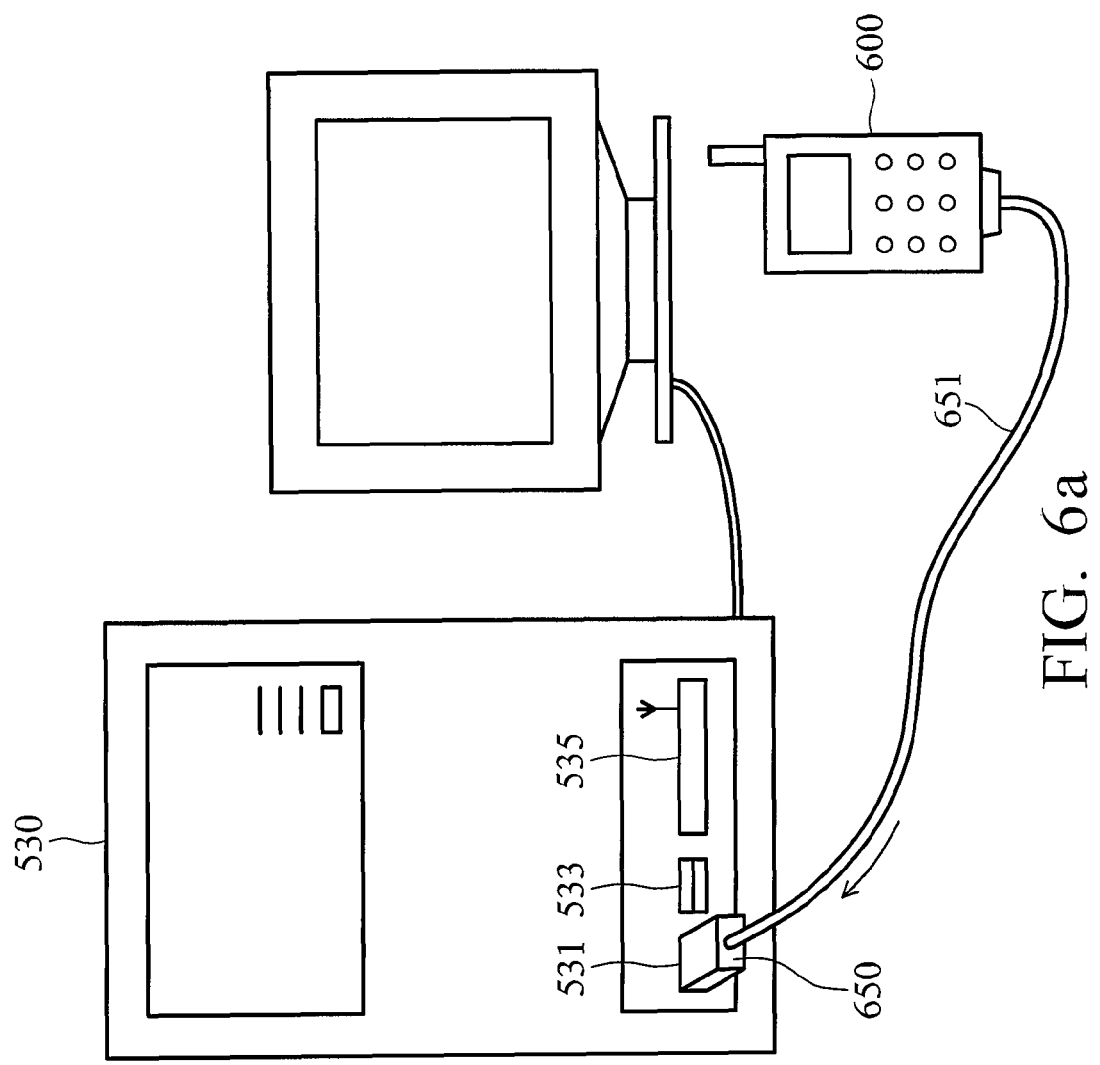

SYSTEMS AND METHODS FOR MANAGING TELEVISION (TV) SIGNALS

CROSS REFERENCE TO RELATED APPLICATIONS

This application claims the full benefit and priority of provisional U.S. Patent Application Ser. No. 60/823,260, filed Aug. 23, 2006, entitled "Systems And Methods For Managing Television (TV) Signals", and incorporates the entire contents of said application herein.

BACKGROUND

The invention relates to electronic devices, and more particularly, to systems and methods for managing heterogeneous television (TV) sources.

Digital set-top boxes are widely used for digital services that offer an on-screen program guide. Most recently, digital set-top boxes provide high-definition TV (HDTV).

SUMMARY

Methods for managing digital television (TV) signals are provided. An exemplary embodiment of a method for managing digital TV signals, performed by an electronic device, comprises the following steps. Multiple first digital TV signals and multiple second digital TV signals are selectively received, enabling display of a series of frames corresponding to the selected digital TV signals on a display device thereof or an external display.

Another embodiment of a method for managing digital TV signals, performed by an electronic device, comprises the following steps. Multiple digital TV signals are received. The received digital TV signals are converted into multiple output signals, and the converted output signals are transmitted to an external display via a connection device thereof, enabling the external display to present a series of frames corresponding to the generated output signals. An incoming call is received. Communication with a remote electronic device is carried out without interrupting the reception of the digital TV signals, and conversion and transmission of the output signals to the external display when answering the incoming call.

Systems for managing digital TV signals are provided. An embodiment of a system for managing digital TV signals, resident on an electronic device, comprises an antenna, a digital TV receiving system coupled to the antenna, and a processor coupled to the digital TV receiving system. The processor configures the digital TV receiving system to selectively receive multiple first digital TV signals and multiple second digital TV signals via the antenna and the digital TV receiving system, thereby enabling a display device thereof or an external display to present a series of frames corresponding to the received digital TV signals.

Another embodiment of a system for managing digital TV signals, resident on an electronic device, comprises a first antenna, a second antenna, a connection device, a digital TV receiving system, a communication system and a processor. The digital TV receiving system coupled to the first antenna receives multiple digital TV signals. The communication system coupled to the second antenna receives an incoming call. The processor coupled to the digital TV receiving system converts the received digital TV signals into multiple output signals, transmits the converted output signals to an external display via the connection device thereof, enabling the external display to present a series of frames corresponding to the generated output signals. The processor communicates with a remote electronic device without interrupting the reception of the digital TV signals, and conversion and transmission of the output signals to the external display when answering the incoming call.

BRIEF DESCRIPTION OF THE DRAWINGS

The invention can be more fully understood by reading the subsequent detailed description and examples with references made to the accompanying drawings, wherein:

FIG. 6a is a diagram of an electronic device connecting to a computer host;

DETAILED DESCRIPTION

Figure 1:
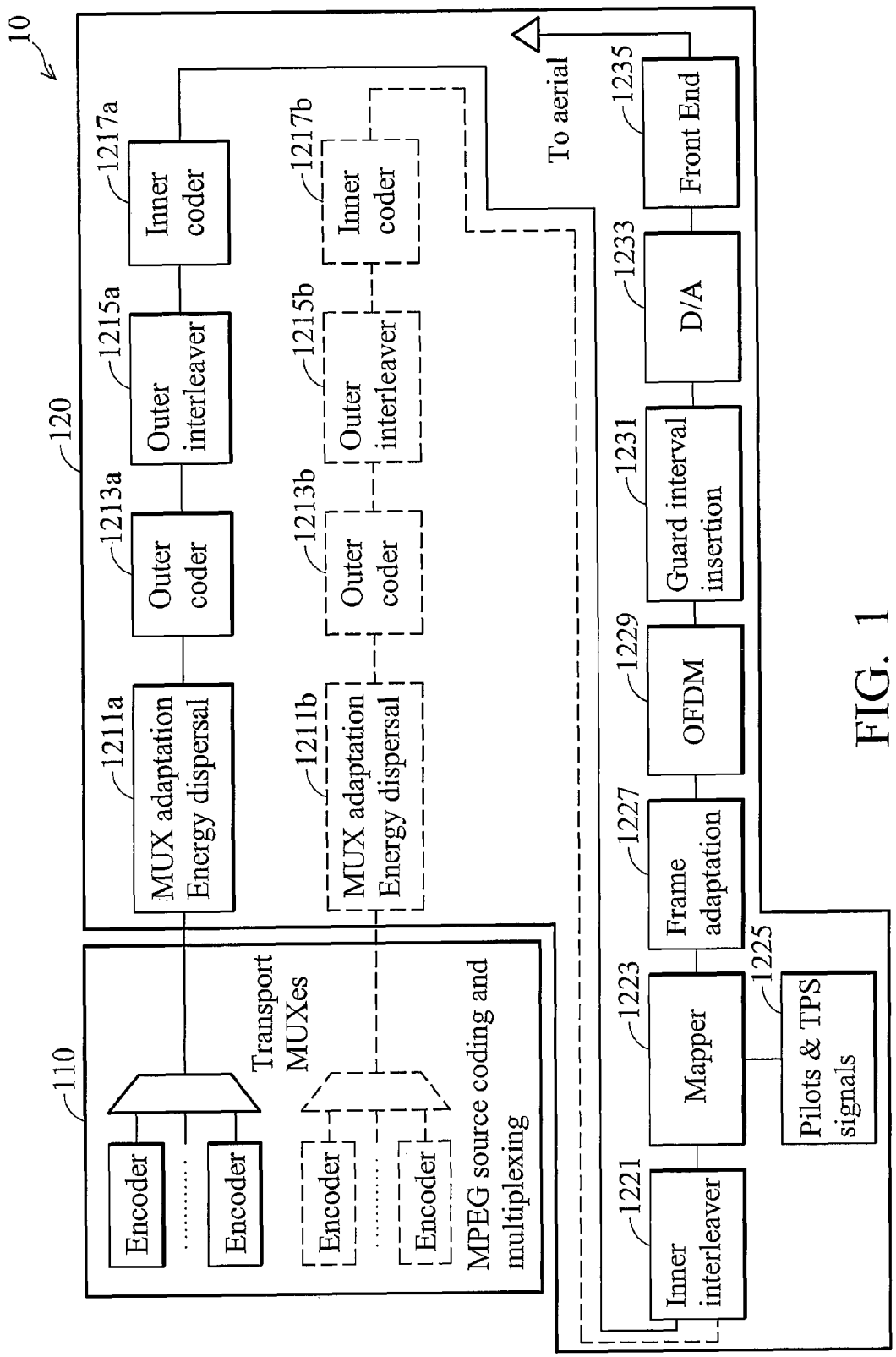
FIG. 1 is a functional block diagram of an exemplary DVB-T transmitting system.

A DVB-T system transmits an MPEG audio/video stream, using OFDM (Orthogonal frequency-division multiplexing) modulation with concatenated channel coding (i.e. COFDM). FIG. 1 is a functional block diagram of an exemplary DVB-T (Digital Video Broadcasting—Terrestrial) transmission system comprising an MPEG source coding and multiplexing unit 110 and a terrestrial channel adapter 120. Video, audio and data streams are multiplexed into an MPEG PS (MPEG Program Stream), and one or more PSs are joined together into an MPEG TS (MPEG Transport Stream) by the MPEG source coding and multiplexing unit 110. The MPEG PS may be an MPEG-1, MPEG-2, MPEG-4, H.263 or H.264 or similar stream. The MEPG TS is the basic digital stream being transmitted and received by a digital TV receiver. Note that two different TSs can be transmitted at the same time, using a technique called hierarchical transmission. Hierarchical transmission may be used, for example, to transmit a standard definition SDTV signal and a high definition HDTV signal on the same carrier. Depending on the quality of the received signal, a digital TV receiver can selectively decode the HDTV and SDTV streams.

The MPEG TS is represented as a sequence of fixed length data packets (e.g. 188 bytes). The byte sequence is decorrelated with a technique called energy dispersal by a MUX adaptation and energy dispersal 1211a or 1211b. An outer coder 1213a or 1213b applies a first level of protection to the transmitted data. For example, a Reed-Solomon RS (204, 188) code is used for correction of up to a maximum of 8 wrong bytes for each 188-byte packet. Convolutional interleaving is used by an outer interleaver 1215a or 1215b to rearrange the transmitted data sequence. An inner coder 1217a or 1217b applies a second level of protection to the transmitted data. For example, a punctured convolutional code is used based on a mother convolutional code of rate ½ with 64 states. In addition to the mother code of rate ½, the inner coder 1217a or 1217b may allow punctured rates of ⅔, ¾, ⅚ and ⅞. An inner interleaver 1221 rearranges data sequence again, aiming to reduce the influence of burst errors. A mapper 1223 maps the digital bit sequence into a base band modulated sequence of complex symbols, such as using QPSK, 16-QAM, 64-QAM, non-uniform 16-QAM or non-uniform 64-QAM constellations. A frame adaptation 1227 groups the complex symbols in blocks of constant length, such as 1512, 3024 or 6048 symbols per block). A frame of 68 blocks length is generated, and a superframe is comprised of four frames. In order to simplify the reception of the signal transmitted on the terrestrial radio channel, additional signals are inserted in each block. Pilot signals 1225 are used during the equalization phase, while TPS (Transmission Parameters Signaling) signals 1225 are used to send the parameters of the transmitted signal and to uniquely identify the transmission cell. An OFDM (Orthogonal Frequency Division Multiplex) 1229 modulates the sequence of blocks using 2048, 4096 or 8192 carriers (i.e. 2 k, 4 k or 8 k mode). In order to decrease receiver complexity, every OFDM block is extended by insertion of a guard interval 1231, copied in front of the end thereof (cyclic prefix). The length of the guard interval can be ½32, ½16, ⅛ or ¼ the original block length. The digital signals are transformed into analog signals, with a digital-to-analog converter (DAC) 1233, and then modulated to radio frequency (VHF, UHF) by a RF front-end 1235. The details of the DVB-T transmitting system may follow the ESTI standard: EN 300 744 V1.5.1, *Digital Video Broadcasting (DVB); Framing structure, channel coding and modulation for digital terrestrial television* established November 2004.

Figure 2:
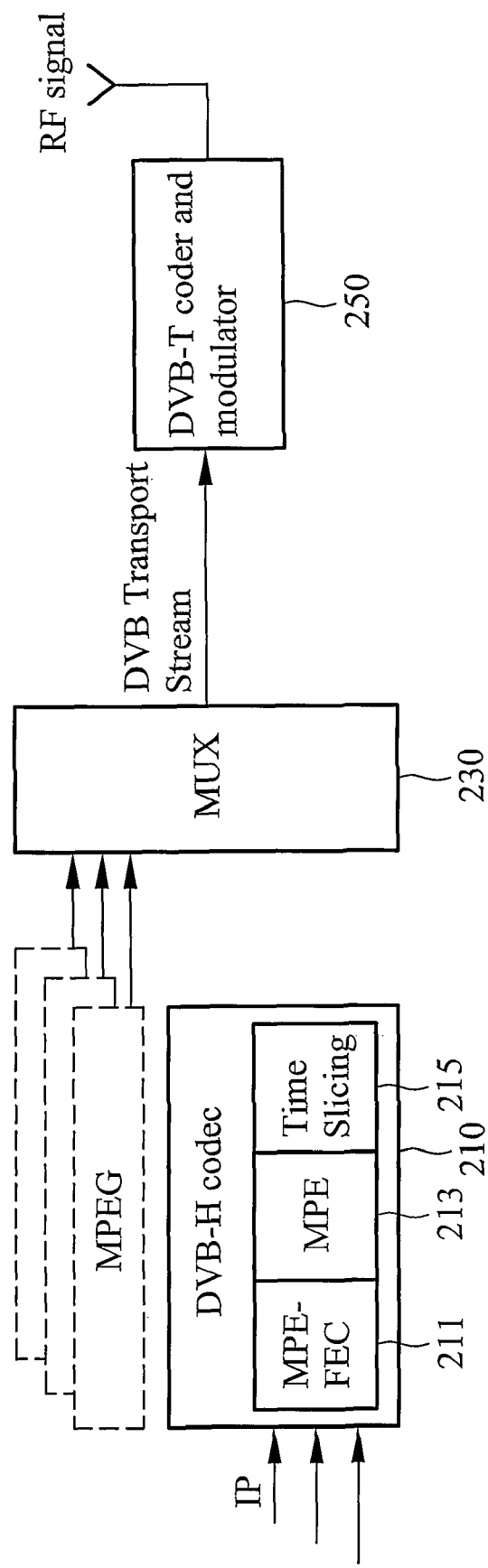
FIG. 2 is a functional block diagram of an exemplary DVB-H transmitting system.
Figure 3:
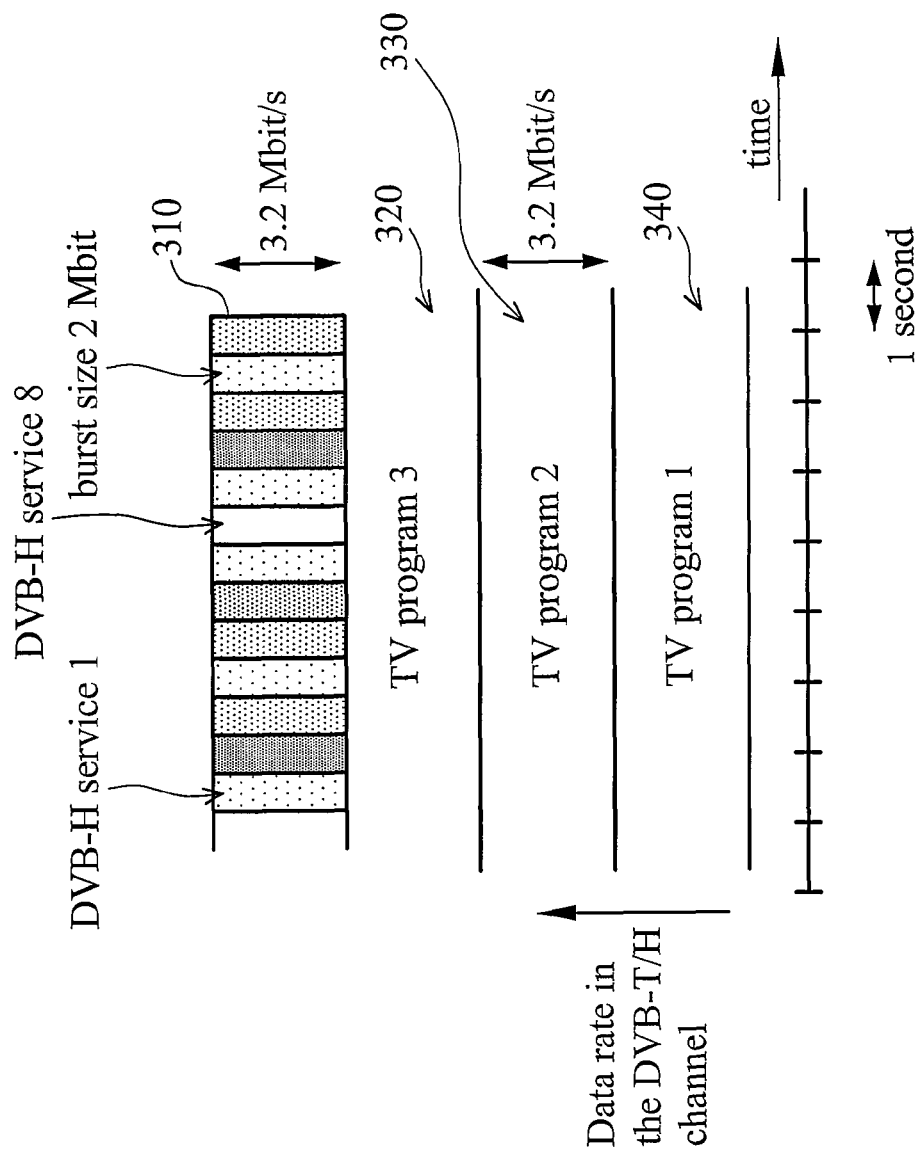
FIG. 3 is a diagram illustrating an exemplary data stream containing time-sliced services.

DVB-H (Digital Video Broadcasting—Handheld) is a technical specification for bringing broadcast services to handheld receivers. FIG. 2 is a functional block diagram of an exemplary DVB-H transmitting system comprising a DVB-H codec 210, a multiplexing unit 230 and a DVB-T coder and modulator 250. DVB-H, as a transmission standard, specifies the physical layer as well as the element of the lowest protocol layers. DVB-H uses a power-saving algorithm based on the time-multiplexed transmission of different services (e.g. TV programs). Time slicing performed by a time slicing module 215 results in a large battery power-saving effect. With DVB-H, service multiplexing is performed in a pure time-division multiplex. The data of one particular service is therefore not transmitted continuously but in compact periodical bursts with interruptions in between. FIG. 3 is a diagram illustrating an exemplary data stream (also called DVB-H TS) containing time-sliced services. One quarter 310 of the assumed total capacity of the DVB-T channel of 13.27 Mbit/s is assigned to DVB-H services whereas the remaining capacity 320 to 340 is shared between ordinary DVB-T services. This example shows that it is feasible to transmit both DVB-T and DVB-H within the same network. Additionally, time slicing allows soft handover if a digital TV receiver moves from one network cell to another with only one receiving unit.

DVB-H, unlike the DVB-T system, is IP (Internet Protocol) based. The DVB-H base-band interface is an IP interface. This interface allows the DVB-H system to be combined with other IP-based networks. The IP data is embedded into the transport stream by means of the MPE (Multi-Protocol Encapsulation). An additional stage of forward error corrections (FEC), referred to as MPE-FEC, is added at the MPE level. The MPE-FEC processing performed by an MPE-FEC module 211 is located on the link layer at the level of the IP input streams before they are encapsulated by means of the MPE performed by the MPE module 213. The MPE-FEC module 211, MPE module 213 and time slicing module 215 together form the DVB-H codec 210 containing the essential DVB-H functionality. The IP input streams as individual elementary streams are multiplexed according the time slicing method. The MPE-FEC error protection is calculated separately for each individual elementary stream. IP packets are subsequently encapsulated and embedded into the transport stream.

Figure 4:
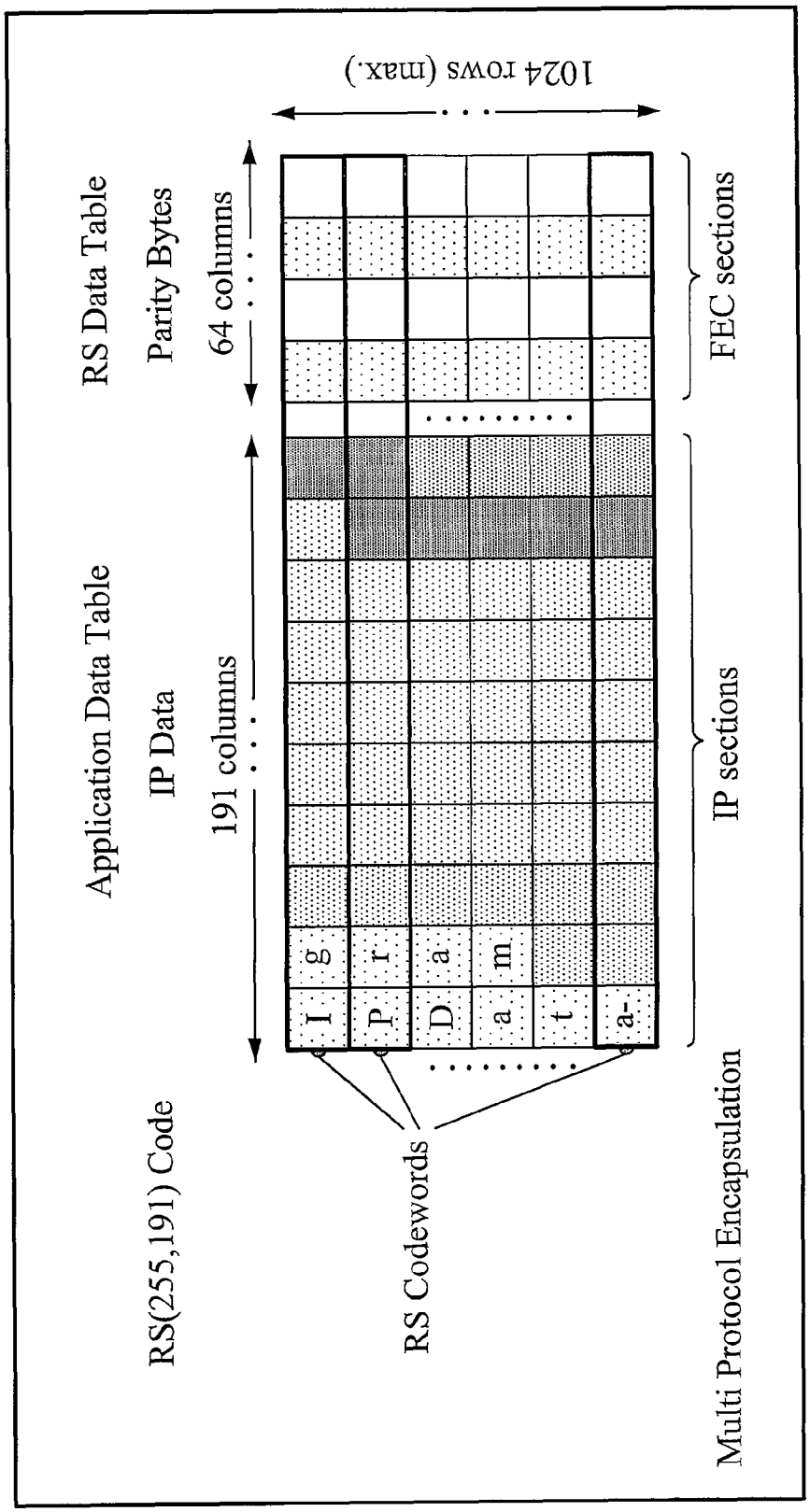
FIG. 4 is a diagram of an exemplary FEC frame.

The MPE-FEC scheme may consist of a Reed-Solomon (RS) code in conjunction with a block interleaver. The MPE-FEC module 211 may create a specific frame structure, the FEC frame, incorporating the incoming data of the DVB-H codec 210. FIG. 4 is a diagram of an exemplary FEC frame consisting of a maximum of 1024 rows and a constant number of 255 columns. Every frame cell corresponds to one byte, and the maximum frame size is approximately 2 Mbits. The FEC frame is separated into two parts, the application data table on the left (191 columns) and the RS data table on the right (64 columns). The application data table is filled with the IP packets of the service to be protected. After applying the RS(255,191) code to the application data row-by-row, the RS data table contains the parity bytes of the RS code. After coding, the IP packets are read from the application data table and encapsulated in IP sections by a well known MPE method. The application data is followed by parity data from the RS data table column-by-column and encapsulated in separate FEC sections. The MPE-FEC is directly related to time slicing. Both techniques are applied at the elementary stream level, and one time-slicing burst may include the content of one or more FEC frames. The details of the DVB-H transmitting system may follow the *ESTI standard: EN 302 304 V1.1.1, Digital Video Broadcasting (DVB); Transmission System for Handheld Terminals (DVB-H)* established November 2004.

Figure 5:
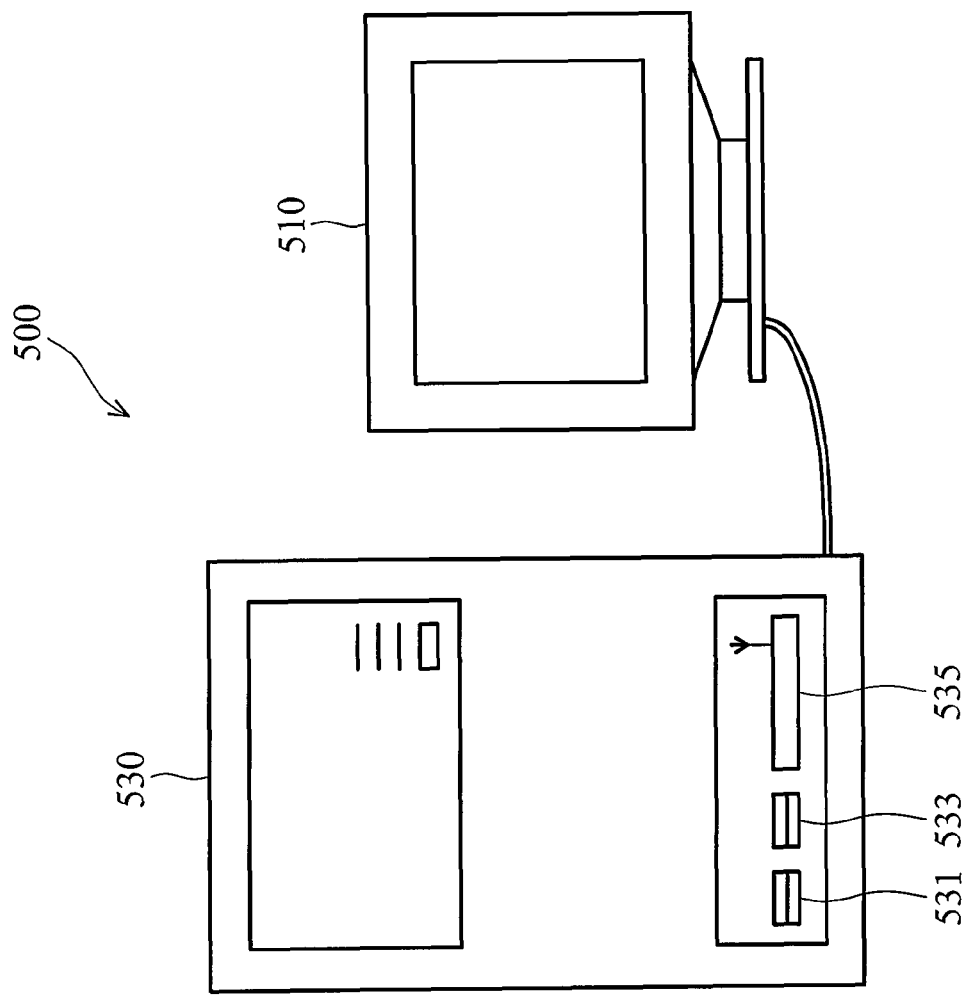
FIG. 5 is a diagram of an embodiment of a computer.

FIG. 5 is a diagram of an embodiment of a computer 100 containing a display 510 and a computer host 530. The computer host 530 is typically equipped with at least one connection port such as 531 and 533 or at least one wireless transceiver 535 coupled to an electronic device such as a mobile phone, a personal digital assistant (PDA) or other. The connection port may be a serial port or a parallel port. A serial port, such as a RS232, RS242, Serial ATA (SATA), Universal Serial Bus (USB), IEEE 1394 or Universal Asynchronous Receiver Transmitter (UART) port or similar, is an interface on a computer system by which information is transferred in or out one bit at a time. A parallel port, such as an Integrated Drive Electronics (IDE), Small Computer System Interface (SCSI), IEEE 1284 port or similar, is an interface on a computer system where data is transferred in or out in parallel, that is, on more than one wire. A parallel port carries one bit on each wire, thus, the transfer rate obtainable over a single cable (contrast serial port) is multiplied. Typically, there are several additional wires on the parallel port that are used for control signals to indicate when data is ready to be sent or received. A wireless transceiver, such as an 802.x, Bluetooth or Infrared Data Association (IrDA) transceiver or similar, is an interface on a computer system by which information is transferred by radio frequency or infrared signals or similar. Moreover, those skilled in the art will understand that some embodiments of the computer 500 may be practiced with other computer system configurations, including handheld devices, multiprocessor-based, microprocessor-based or programmable consumer electronics, notebooks or the like.

Figure 6B:
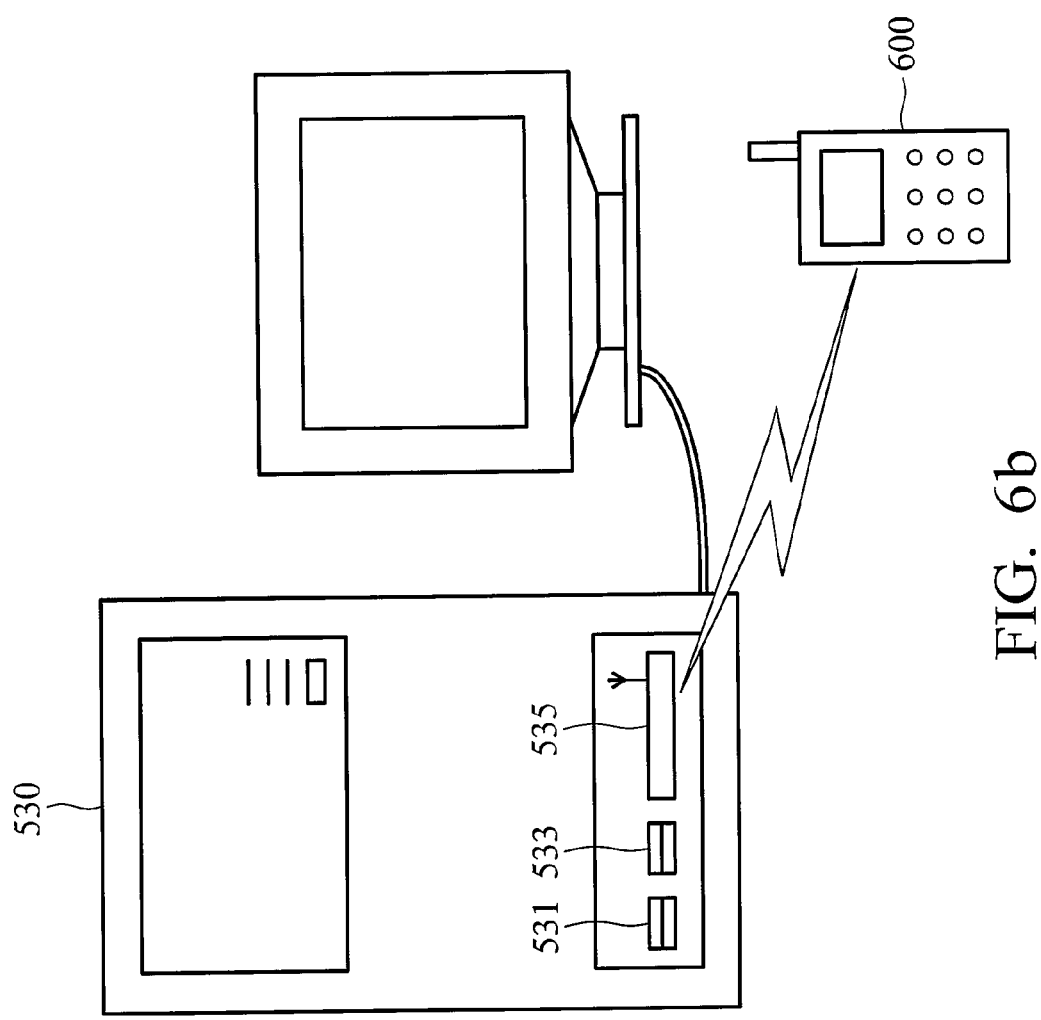
FIG. 6b is a diagram of an electronic device coupled to a computer host.

FIG. 6a is a diagram of the electronic device 600 connecting to the computer host 530 via a connector 650, a connection wire 651 and the connection port 531. The electronic device 600 preferably connects to the computer host 530 via USB connector, USB link and USB connector in order to acquire power from the computer host 600. FIG. 6b is a diagram of the electronic device 600 coupled to the computer host 530 by associating with the wireless transceiver 535. When the electronic device 600 couples to the computer host 530 via the connection port 531 or the wireless transceiver 535, the computer host 530 may identify and configure the electronic device 600 as an external TV signal receiver by employing the universal plug and play (UPnP) protocol set forth by the UPnP forum. Thereafter, the computer host 530 can receive heterogeneous TV signals, such as the DVB-T, DVB-H signals or similar, via the electronic device 600.

Figure 7:
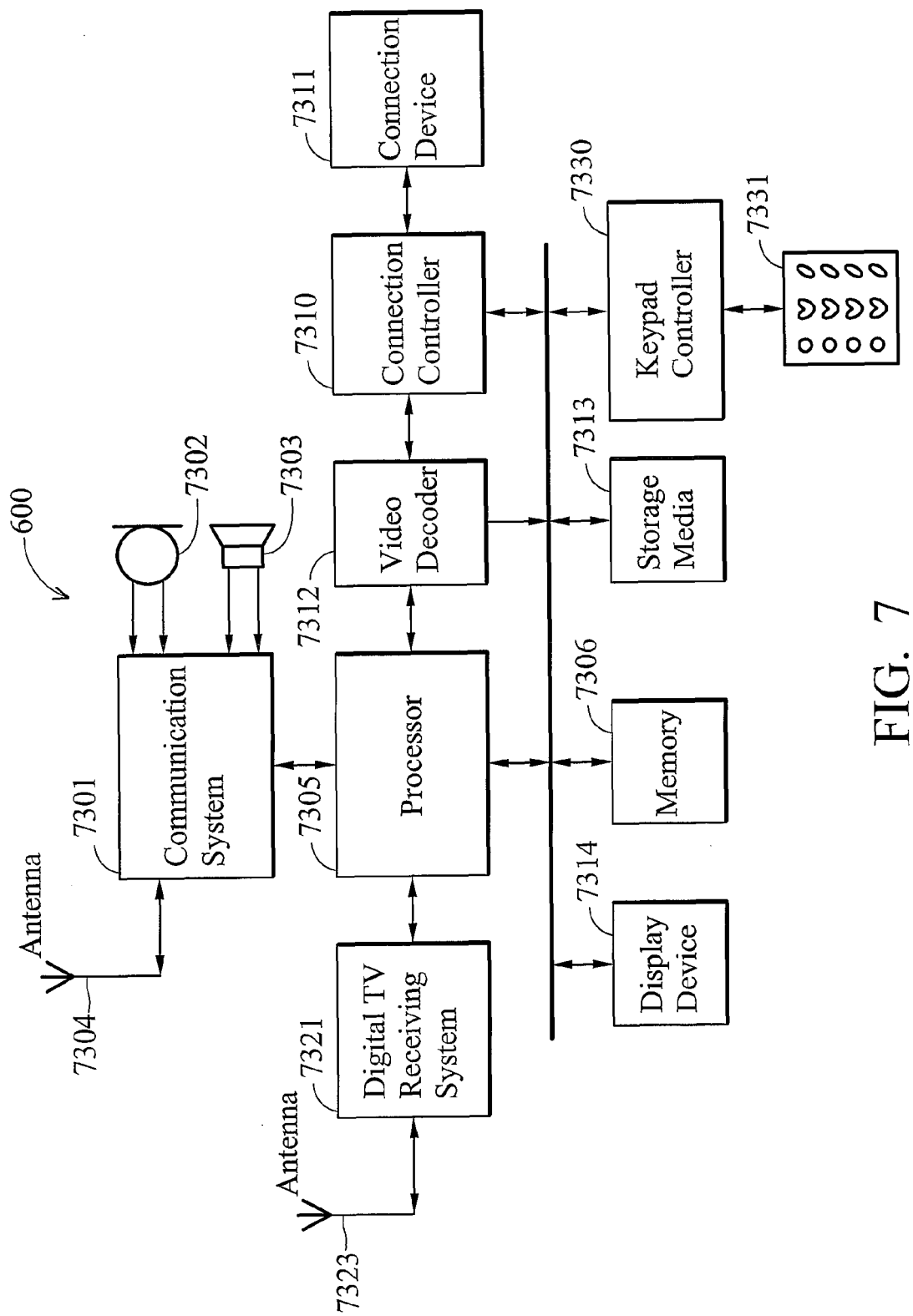
FIG. 7 is a diagram of a hardware environment applicable to a mobile electronic device.

FIG. 7 is a diagram of a hardware environment applicable to a mobile electronic device 700 mainly comprising a communication system 7301, a microphone 7302, a speaker 7303, dual antennas 7304 and 7323, a processor 7305, memory 7306, a connection controller 7310, a video decoder 7312, storage media 7313, a display device 7314, a digital TV receiving system 7321 and a key pad controller 7330. The communication system 7301 communicates with other remote mobile electronic devices via the antenna 7304 when connecting to a cellular network, such as global system for mobile communications (GSM), general packet radio service (GPRS), enhanced data rates for global evolution (EDGE), code division multiple access (CDMA), wideband code division multiple access (WCDMA) or circuit switched data (CSD) system or similar. The processor 7305 directs the Digital TV receiving system 7321 to selectively receive the DVB-T and DVB-H signals via the antenna 7323 according to relevant configuration parameters. The processor 7305 may periodically issue polling requests to the communication system 7301 in order to acquire information indicating whether an incoming call is received while receiving DVB-T or DVB-H signals. The processor 7305 may use a multitasking environment to execute two or more software tasks respectively communicating with a remote mobile electronic device via the communication system 7301, and receiving TV signals via the digital TV receiving system 7321 when detecting that an incoming call from a remote mobile electronic device has received. Thus, the mobile electronic device 700 can simultaneously communicate with a remote mobile electronic device via the communication system 7301 and operate as an external digital TV receiver when answering the incoming call. The processor 7305 connects to the communication system 7301, digital TV receiving system 7321, memory 7306, connection controller 7310, video decoder 7312, storage media 7313, display device 7314, and key pad controller 7330 via various bus architectures.

Figure 8:
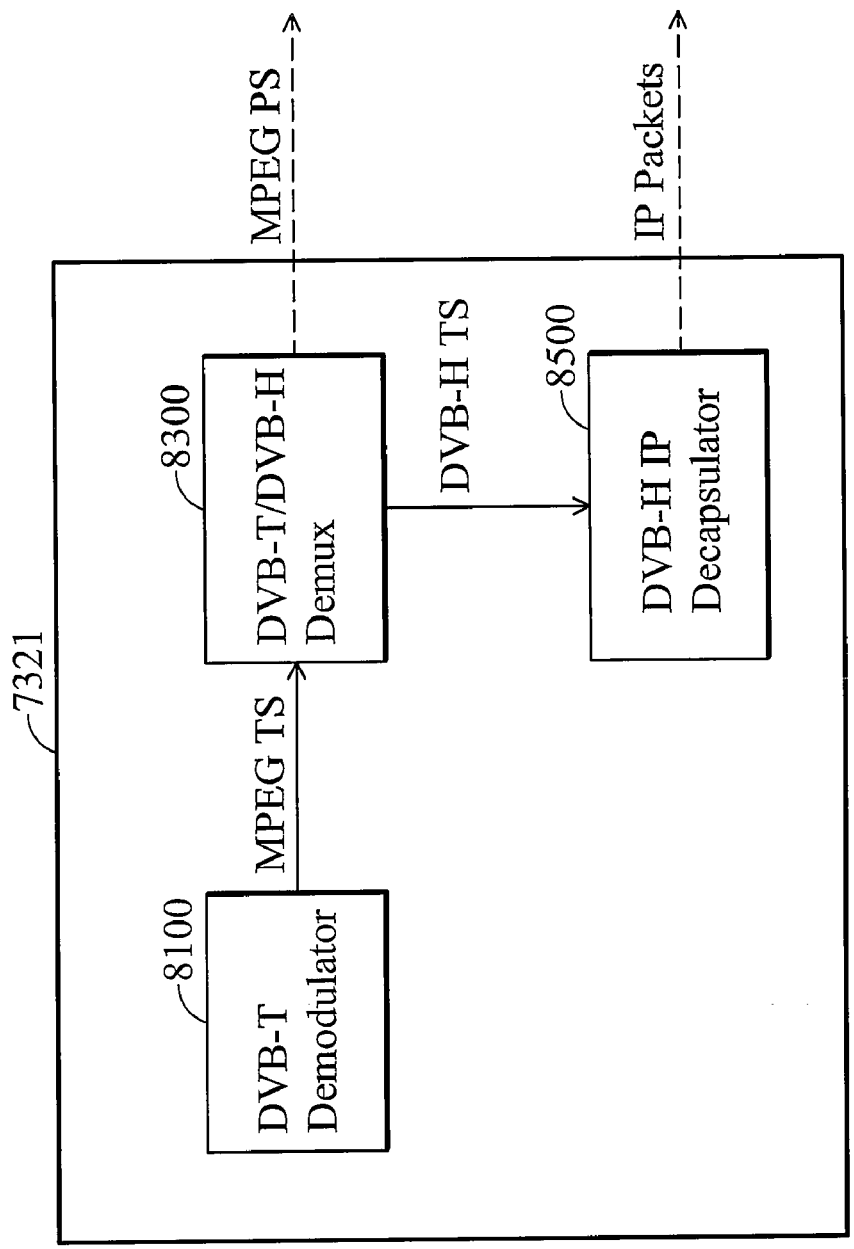
FIG. 8 is a block diagram of an embodiment of a digital TV receiving system.

FIG. 8 is a block diagram of an embodiment of the digital TV receiving system 7321 comprising a DVB-T demodulator 8100, a DVB-T/DVB-H demux 8300 and a DVB-H IP decapsulator 8500. The DVB-T demodulator 8100 converts the received radio frequency (VHF, UHF) to base-band via RF front-end, and then transforms the base-band into digital signals, with an analog-to-digital converter (ADC) thereof. The digital base band signals are searched to identify the beginning of frames and blocks, with a time and frequency synchronization module thereof. The cyclic prefix is then removed from a guard interval thereof. The sequence of blocks using 2048, 4096 or 8192 carriers (i.e. 2 k, 4 k or 8 k mode) are demodulated, with an OFDM demodulation module thereof. A frequency equalization module thereof uses pilot signals (e.g. 1225 of FIG. 1) to equalize the received signals. The base band modulated sequence of complex symbols, such as using QPSK, 16-QAM, 64-QAM, non-uniform 16-QAM or non-uniform 64-QAM constellations, is de-mapped, with a de-mapping module thereof. The de-mapped results undergo internal deinterleaving, internal decoding, external deinterleaving, external decoding and MUX adaptation, respectively opposite to operations in inner interleaver (e.g. 1221 of FIG. 1), inner coder (e.g. 1217a or 1217b of FIG. 1), outer interleaver (e.g. 1215a or 1215b), outer coder (e.g. 1213a or 1213b) and MUX adaptation and energy dispersal (e.g. 1211a or 1211b), to obtain the original MPEG TS.

When the digital TV receiving system 7321 is configured to receive DVB-T signals, the DVB-T demux 3800, opposite to an MEPG source coding and multiplexing unit (e.g. 110 of FIG. 1), is activated to acquire MPEG PS from the obtained MPEG TS. When the digital TV receiving system 7321 is configured to receive DVB-H signals, the DVB-H demux 3800 is activated to synchronize to the bursts of the wanted service but switches to a power-saving mode during the intermediate time to obtain DVB-H TS or FEC frames. When obtaining FEC frames, the DVB-H demux 3800 further perform FEC decoding to obtain DVB-H TS. The DVB-H IP decapsulator 8500 subsequently acquires IP packets containing the original MPEG PS, such as video, audio and/or data streams, from the obtained DVB-H TS.

Figure 9A:
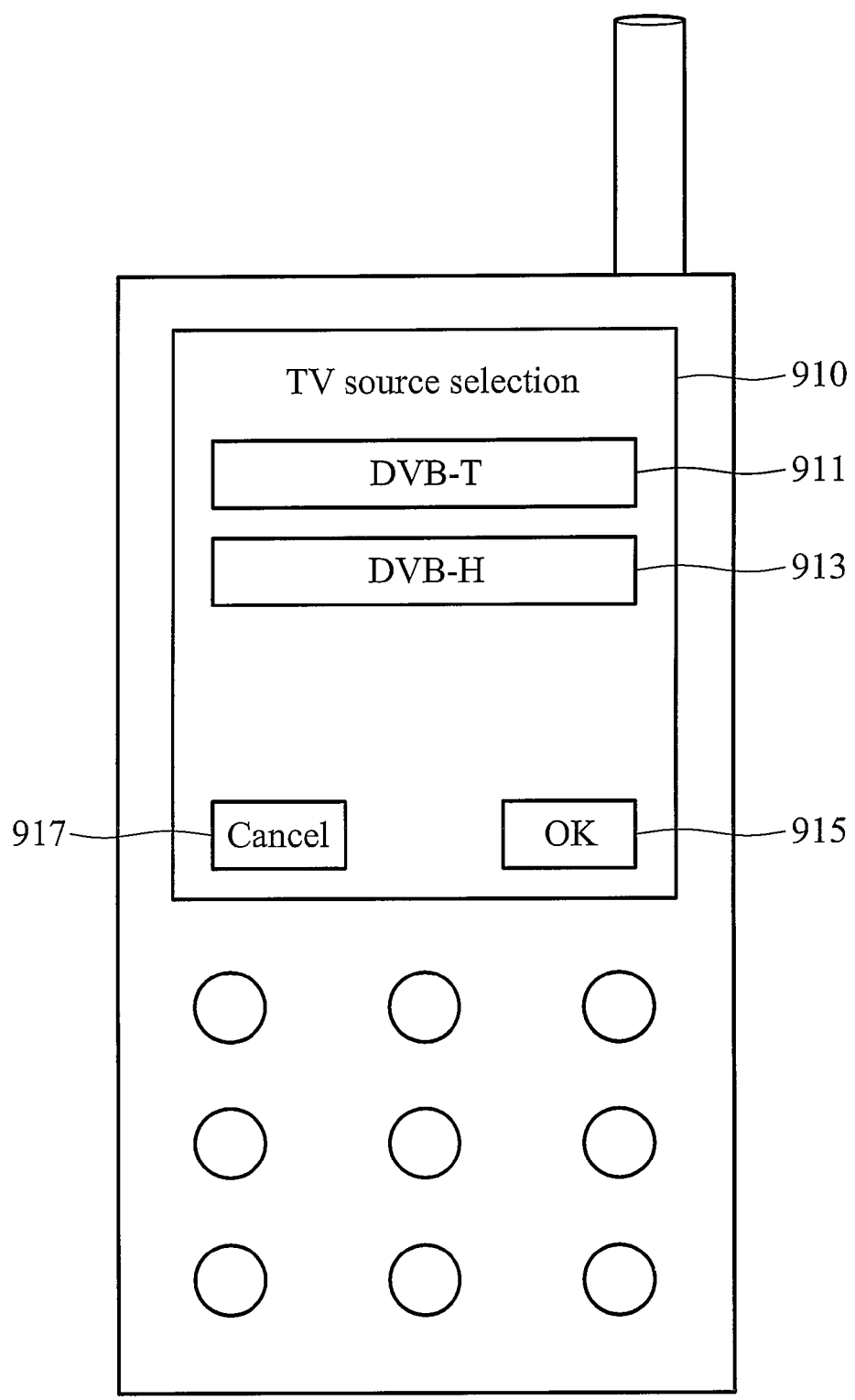
FIG. 9a is a diagram of an exemplary MMI of a TV source selection menu.
Figure 9B:
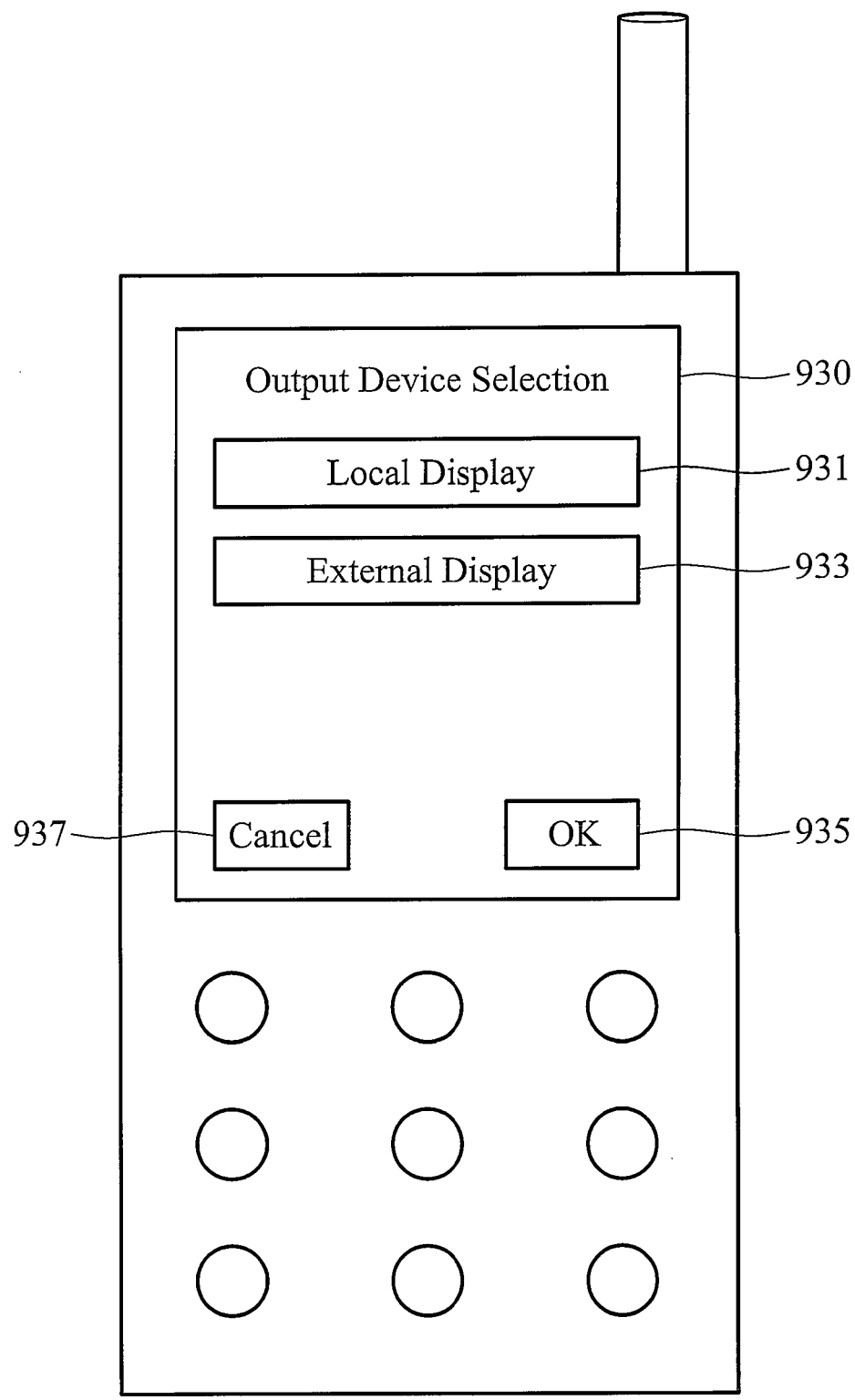
FIG. 9b is a diagram of an exemplary MMI of an output device selection menu.
Figure 9C:
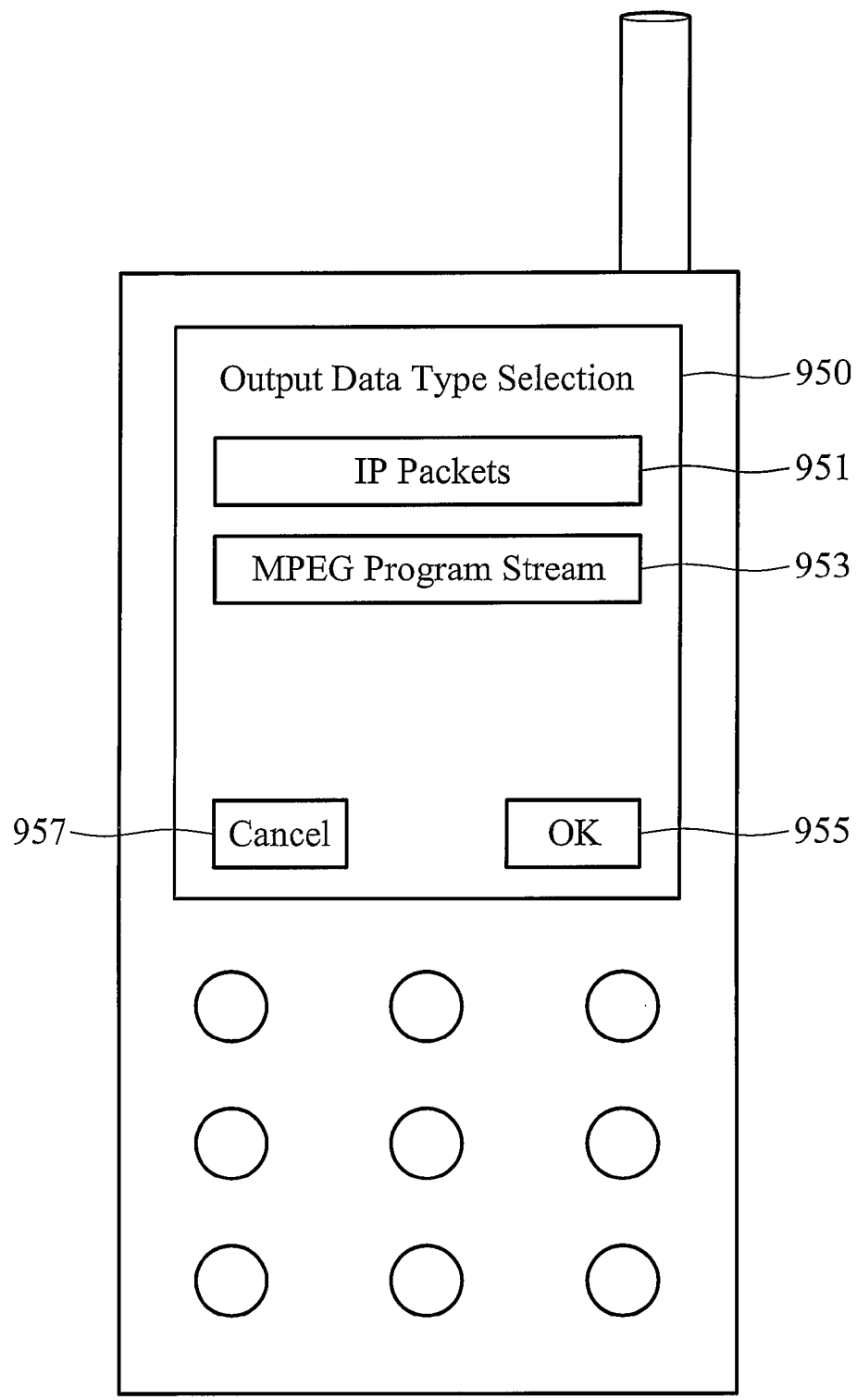
FIG. 9c is a diagram of an exemplary MMI of an output data type selection menu.

A display device (e.g. 7314 of FIG. 7) such as a color super-twisted nomadic (CSTN) display, a thin film transistor-liquid crystal display (TFT-LCD), an organic light-emitting diode (OLED) display or similar, may display various MMIs to facilitate parameter configuration of a digital TV receiver. When a keypad controller (e.g. 7330 of FIG. 7) detects that a hard key on a keypad (e.g. 7331 of FIG. 7) has been pressed, a corresponding keystroke event is triggered and relevant software instructions are executed for configuring certain hardware circuits (e.g. at least one of 7312 and 7310 of FIG. 7, and 8100, 8300 and 8500 of FIG. 8). FIG. 9a is a diagram of an exemplary MMI of a TV source selection menu 910 containing two menu items 911 and 913 and two soft keys 915 and 917. The menu items 911 and 913 respectively display text prompts "DVB-T" and "DVB-H". It is determined whether DVB-T or DVB-H signals are to be received by operating the TV source selection menu 910. FIG. 9b is a diagram of an exemplary MMI of an output device selection menu 930 containing two menu items 931 and 933 and two soft keys 935 and 937. The menu items 931 and 933 respectively display text prompts "local display" and "external display". It is determined whether the obtained MPEG PS or IP packets carried in DVB-T or DVB-H signals are to be output to a display device (e.g. 7314 of FIG. 7) or an external display via a connection controller and a connection device (e.g. 7310 and 7311 of FIG. 7) by operating the output device selection menu 930. The connection device may be the described serial port, parallel port or wireless transceiver. FIG. 9c is a diagram of an exemplary MMI of an output data type selection menu 950 containing two menu items 951 and 953 and two soft keys 955 and 957. The menu items 951 and 953 respectively display text prompts "IP Packets" and "MPEG Program Stream". It is determined whether the obtained IP packets or MPEG PS is transmitted to an external display device through the connection controller and the connection device by operating the output data type selection menu 950. Such configured parameters may be stored in memory (e.g. 7306 of FIG. 7) or storage media (7313 of FIG. 7) for further reference.

Figure 10A:
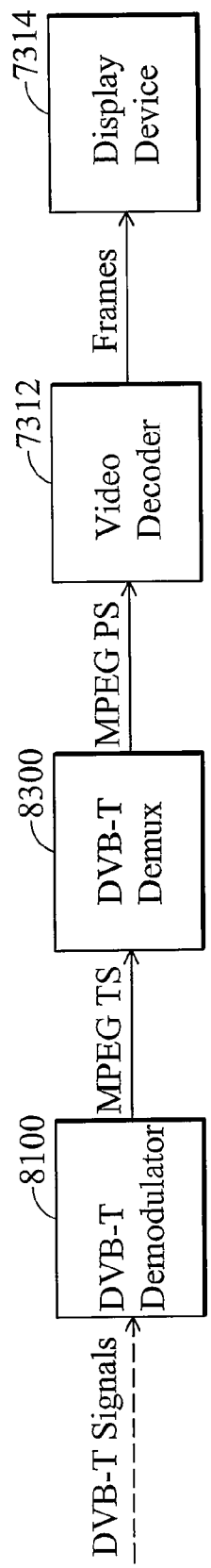
FIGS. 10a to 10e are exemplary data transmission pipelines for various configuration scenarios.

Several scenarios for configuring parameters for a digital TV receiver are provided. FIG. 10a is a data transmission pipeline for a first configuration scenario. As the configured parameters indicate that DVB-T signals are to be received, and MPEG PS carried in the received DVB-T signals is to be output to a local display device, a DVB-T demodulator 8100 is first activated to receive DVB-T signals to obtain MPEG TS. The DVB-T demux 8300 is activated to acquire MPEG PS from the obtained MPEG TS and is configured to transmit the acquired MPEG PS to the video decoder 7312. The video decoder 7312 decodes the received MPEG PS to obtain a series of frames. Finally, the obtained frames are sequentially displayed on the display device 7314.

Figure 10B:
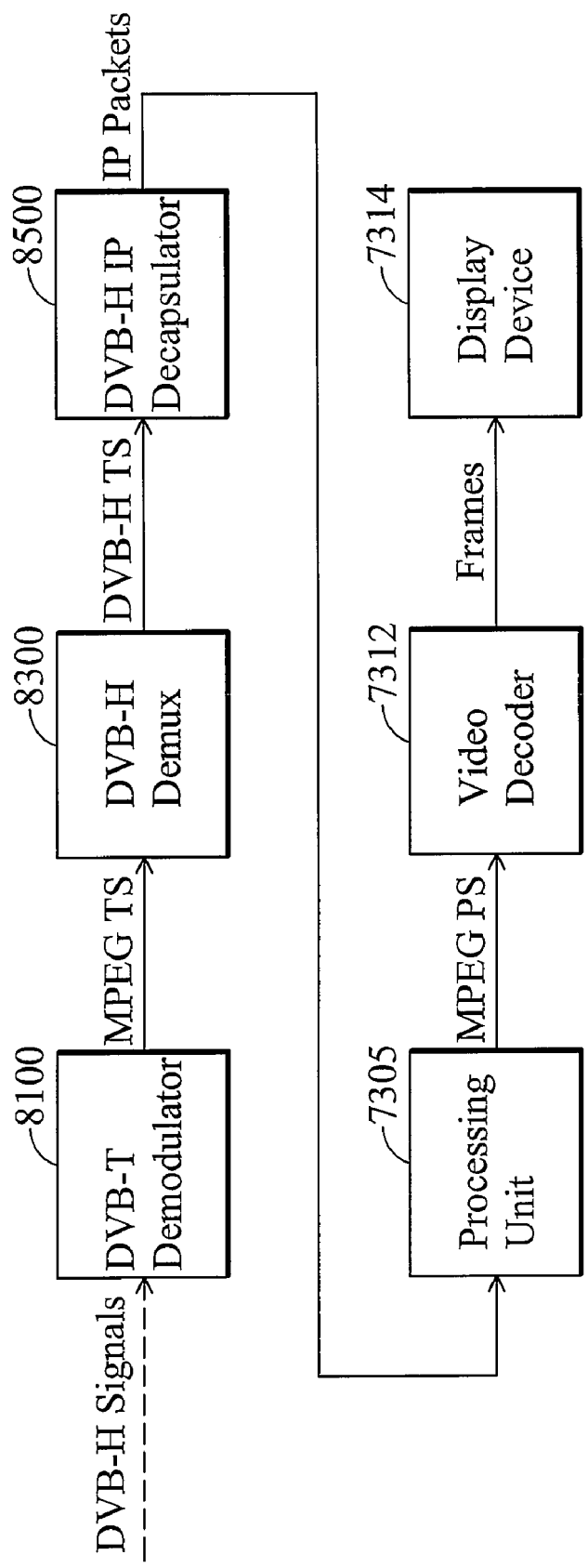

FIG. 10*b* is a data transmission pipeline for a second configuration scenario. As the configured parameters indicate that DVB-H signals are to be received and MPEG PS carried in the received DVB-H signals are to be output to a local display device, the DVB-T demodulator 8100 is first activated to receive DVB-H signals to obtain MPEG TS. The DVB-T demux 8300 is activated to acquire DVB-H TS from the obtained MPEG TS and is configured to transmit the acquired DVB-H TS to the DVB-H IP decapsulator 8500. The DVB-H IP decapsulator 8500 acquires IP packets from the DVB-H TS and transmits the acquired IP packets to the processing unit 7305. A relevant software application executed in the processing unit 7305 acquires MPEG PS from the IP packets and transmits the acquired MPEG PS to the video decoder 7312. The video decoder 7312 decodes the received MPEG PS to obtain a series of frames. Finally, the obtained frames are sequentially displayed on the display device 7314.

Figure 10C:
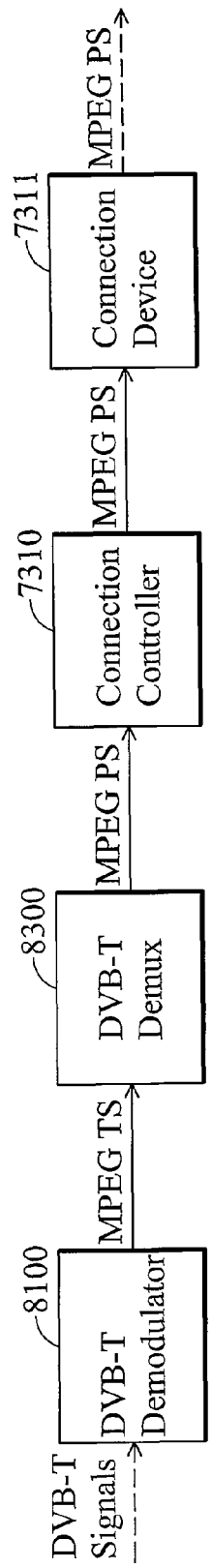

FIG. 10*c* is a data transmission pipeline for a third configuration scenario. As the configured parameters indicate that DVB-T signals are to be received, and MPEG PS carried in the received DVB-T signals is to be output to an external display device, a DVB-T demodulator 8100 is first activated to receive DVB-T signals to obtain MPEG TS. The DVB-T demux 8300 is activated to acquire MPEG PS from the obtained MPEG TS and is configured to transmit the acquired MPEG PS to the connection controller 7310. The connection controller 7310 directly transmits the received MPEG PS to an external electronic device such as a notebook, a personal computer, a personal digital assistant (PDA), a portable media player (PMP) or similar, thereby enabling the external electronic device to decode the MPEG PS to a series of frames and display the decoded frames on a display device thereof.

Figure 10D:
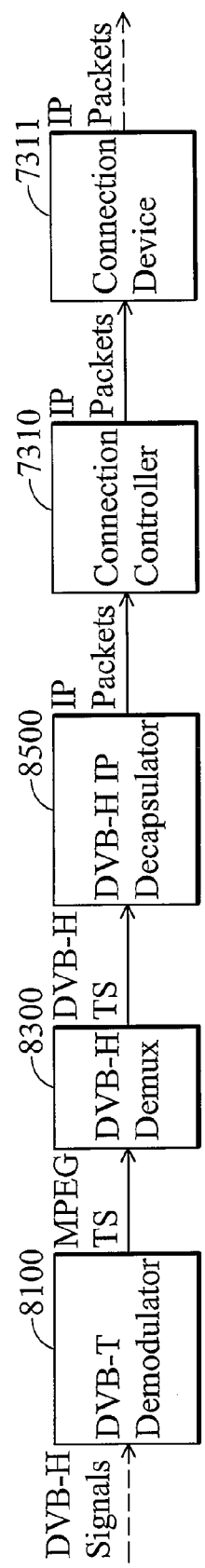

FIG. 10*d* is a data transmission pipeline for a fourth configuration scenario. As the configured parameters indicate that DVB-H signals are to be received, and IP packets carried in the received DVB-H signals are to be output to an external display device, the DVB-T demodulator 8100 is first activated to receive DVB-H signals to obtain MPEG TS. The DVB-T demux 8300 is activated to acquire DVB-H TS from the obtained MPEG TS and is configured to transmit the acquired DVB-H TS to the DVB-H IP decapsulator 8500. The DVB-H IP decapsulator 8500 acquires IP packets from the DVB-H TS and transmits the acquired IP packets to the connection controller 7310. The connection controller 7310 directly transmits the received MPEG PS to an external electronic device such as a notebook, a personal computer, a PDA, a PMP or similar, thereby enabling the external electronic device to acquire MEPG PS from the IP packets, decode the MPEG PS to a series of frames and display the decoded frames on a display device thereof.

Figure 10E:
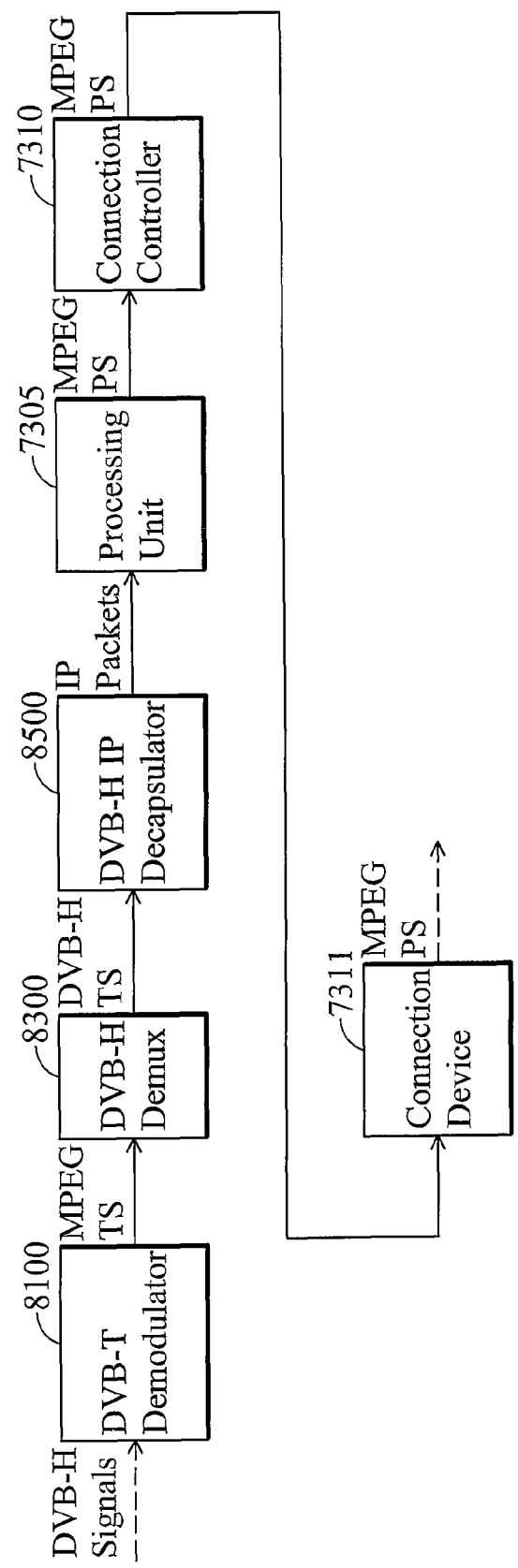

FIG. 10*e* is a data transmission pipeline for a fifth configuration scenario. As the configured parameters indicate that DVB-H signals are to be received, and MPEG PS carried in the received DVB-H signals are to be output to an external display device, the DVB-T demodulator 8100 is first activated to receive DVB-H signals to obtain MPEG TS. The DVB-T demux 8300 is activated to acquire DVB-H TS from the obtained MPEG TS and is configured to transmit the acquired DVB-H TS to the DVB-H IP decapsulator 8500. The DVB-H IP decapsulator 8500 acquires IP packets from the DVB-H TS and transmits the acquired IP packets to the a relevant software executed in the processing unit 7305. The software acquires MPEG PS from the IP packets and transmits the acquired MPEG PS to the connection controller 7310. The connection controller 7310 directly transmits the received MPEG PS to an external electronic device such as a notebook, a personal computer, a PDA, a PMP or similar, thereby enabling the external electronic device to decode the MPEG PS to a series of frames and display the decoded frames on a display device thereof.

Methods for managing digital TV signals, or certain aspects or portions thereof, may take the form of program codes (i.e., instructions) embodied in tangible media, such as floppy diskettes, CD-ROMs, hard drives, or any other machine-readable storage medium, wherein, when the program codes are loaded into and executed by a machine, such as a computer, a DVD recorder or similar, the machine becomes an apparatus for practicing the invention. The disclosed methods may also be embodied in the form of program codes transmitted over some transmission medium, such as electrical wiring or cabling, through fiber optics, or via any other form of transmission, wherein, when the program codes are received and loaded into and executed by a machine, such as a computer, a mobile phone or similar, the machine becomes an apparatus for practicing the invention. When implemented on a general-purpose processor, the program codes combine with the processor to provide a unique apparatus that operate analogously to specific logic circuits.

Certain terms are used throughout the description and claims to refer to particular system components. As one skilled in the art will appreciate, consumer electronic equipment manufacturers may refer to a component by different names. This document does not intend to distinguish between components that differ in name but not function.

Although the invention has been described in terms of preferred embodiment, it is not limited thereto. Those skilled in the art can make various alterations and modifications without departing from the scope and spirit of the invention. Therefore, the scope of the invention shall be defined and protected by the following claims and their equivalents.

What is claimed is:

1. A method for managing digital television (TV) signals, performed by an electronic device, the method comprising:
    receiving a TV signal;
    providing a parameter from a man-machine interface (MMI) comprising two items, wherein one item prompts a user to configure the electronic device to display the received digital TV signal on a display of the electronic device when selected, and wherein the other item prompts the user to configure the electronic device to display the received digital TV signal on an external display when selected;
    decoding the received digital TV signal to generate a series of frames, and displaying the generated frames on the display device thereof when a first parameter indicates that the received digital TV signal is displayed on the display thereof as being selected by the user; and
    converting the received digital TV signal into a converted output signal, and transmitting the converted output signal to the external display via a connection device of the electronic device when the first parameter indicates that the received digital TV signal is displayed on the external display as being selected by the user, enabling the external display to present a series of frames corresponding to the converted output signal, wherein the conversion undergoes a conversion path configured based on a plurality of device combinations wherein the device combinations comprise:
  a first device combination comprising a DVB-T demux when obtaining an MPEG packet stream from the received DVB-T signal as the converted output signal;
  a second device combination comprising a DVB-H demux and an Internet protocol (IP) decapsulator when obtaining IP packets from the received DVB-H signal as the converted output signal; and
  a third device combination comprising a DVB-H demux, an Internet decapsulator and a processor when obtaining an MPEG packet stream from the received DVB-H signal as the converted output signal.

2. The method as claimed in claim 1 wherein the electronic device is a mobile phone.

3. The method as claimed in claim 1 wherein the digital TV signal is DVB-T (Digital Video Broadcasting—Terrestrial) or DVB-H (Digital Video Broadcasting—Handheld) signal.

4. The method as claimed in claim 1 further comprising:
  providing a second parameter; and
  receiving DVB-T (Digital Video Broadcasting—Terrestrial) or DVB-H (Digital Video Broadcasting—Handheld) signal in terms of the second parameter.

5. The method as claimed in claim 4 wherein the second parameter is provided by the MMI, and the MMI further comprises two items, in which one prompts the user to configure the electronic device to receive DVB-T signal when selected, and the other prompts the user to configure the electronic device to receive DVB-H signal when selected.

6. The method as claimed in claim 1 further comprising:
  providing a second parameter indicating that the converted output signal is generated in a first format or a second format when the first parameter indicates that the received digital TV signal is output to the external display; and
  generating the converted output signal in the first format or the second format according to the second parameter.

7. The method as claimed in claim 6 wherein the converted output signal encoded in the first format comprises an MPEG transport stream (TS) and the output signal encoded in the second format comprises a plurality of Internet packets (IPs).

8. The method as claimed in claim 6 wherein the second parameter is provided via the MMI, and the MMI further comprises two items, in which one prompts the user to configure the electronic device to output the received digital TV signal in the first format when selected, and the other prompts the user to configure the electronic device to output the received digital TV signal in the second format when selected.

9. A system for managing digital television (TV) signals, resident on an electronic device having an antenna, a connection device, and a display, the system comprising:
  a digital TV receiving system coupled to the antenna, and receiving a digital TV signal via the antenna; and
  a processor coupled to the digital TV receiving system, providing a first parameter via a man-machine interface (MMI) comprising two items, in which one prompts a user to configure the electronic device to display the received digital TV signal on the display when selected, and the other prompts the user to configure the electronic device to display the received digital TV signal on an external display when selected, decoding the received digital TV signal to generate a series of frames, and displaying the generated frames on the display device when the first parameter indicates that the received digital TV signal is displayed on the display device as being selected by the user, and converting the received digital TV signal into a converted output signal, and transmitting the converted output signal to the external display via the connection device when the first parameter indicates that the received digital TV signal is displayed on the external display as being selected by the user, enabling the external display to present a series of frames corresponding to the converted output signal, wherein the processor further converts the received digital TV signal into the output signal through a conversion path configured based on a plurality of device combinations, wherein the device combinations comprise:
  a first device combination comprising a DVB-T demux when obtaining an MPEG packet stream from the received DVB-T signal as the converted output signal;
  a second device combination comprising a DVB-H demux and an Internet protocol (IP) decapsulator when obtaining IP packets from the received DVB-H signal as the converted output signal; and
  a third device combination comprising a DVB-H demux, an Internet decapsulator and a processor when obtaining an MPEG packet stream from the received DVB-H signal as the converted output signal.

10. The system as claimed in claim 9 wherein the electronic device is a mobile phone.

11. The system as claimed in claim 9 wherein the digital TV signal is DVB-T (Digital Video Broadcasting—Terrestrial) or DVB-H (Digital Video Broadcasting—Handheld) signal.

12. The system as claimed in claim 11 wherein the digital TV receiving system comprises a DVB-T demodulator, a DVB-T/DVB-H demux and a DVB-H IP decapsulator, the processor provides a second parameter, obtains an MPEG transport stream (TS) via the DVB-T demodulator and activates the DVB-T demodulator to acquire an MPEG program stream (PS) comprising the series of frames from the obtained MPEG TS when the second parameter indicates to receive DVB-T signal, and the processor obtains an MPEG transport stream (TS) via the DVB-T demodulator, activates the DVB-H demux to synchronize to the bursts of wanted service but a power-saving mode during the intermediate time to obtain a DVB-H TS, and activates the DVB-H IP descapsulator to acquire IP (Internet Protocol) packets comprising the series of frames from the obtained DVB-H TS when the second parameter indicates to receive DVB-H signal.

13. The system as claimed in claim 12 wherein the first digital TV signals and the second digital TV signals are selectively received according to a second parameter configured by a man-machine interface (MMI) provided by the electronic device the second parameter is provided by the MMI, and the MMI further comprises two items, in which one prompts the user to configure the electronic device to receive DVB-T signal when selected, and the other prompts the user to configure the electronic device to receive DVB-H signal when selected.

14. The system as claimed in claim 9 wherein the connection device is an USB connection device and the electronic device acquires power through the USB connection device from an external electronic device coupled to the external display.

15. The system as claimed in claim 9 wherein the processor provides a second parameter indicating that the converted output signal is generated in a first format or a second format when the first parameter indicates that the received digital TV signal is output to the external display, and generates the converted output signal in the first format or the second format according to the second parameter.

16. The system as claimed in claim 15 wherein the converted output signal encoded in the first format comprises an MPEG transport stream (TS) and the converted output signal encoded in the second format comprises a plurality of Internet packets (IPs).

17. The system as claimed in claim 15 wherein the second parameter is provided via the MMI, and the MMI further comprises two items, in which one prompts the user to configure the electronic device to output the received digital TV signal in the first format when selected, and the other prompts the user to configure the electronic device to output the received digital TV signal in the second format when selected.

* * * * *